United States Patent
Tsujita et al.

(10) Patent No.: US 10,513,783 B2
(45) Date of Patent: Dec. 24, 2019

(54) CHROMIUM-FREE PAINT COMPOSITION AND PAINT FILMS OBTAINED BY COATING SAME

(71) Applicant: Akzo Nobel Coatings International B.V., Arnhem (NL)

(72) Inventors: Takahiro Tsujita, Kanagawa (JP); Nobuhiro Nishida, Yokohama (JP); Yoshitomo Takeuchi, Yokohama (JP); Katsuhiko Ohsawa, Kanagawa (JP)

(73) Assignee: BASF COATINGS GMBH, Munster (DE)

( * ) Notice: Subject to any disclaimer, the term of this patent is extended or adjusted under 35 U.S.C. 154(b) by 154 days.

(21) Appl. No.: 14/366,850

(22) PCT Filed: Dec. 4, 2012

(86) PCT No.: PCT/IB2012/002623
§ 371 (c)(1),
(2) Date: Jun. 19, 2014

(87) PCT Pub. No.: WO2013/093586
PCT Pub. Date: Jun. 27, 2013

(65) Prior Publication Data
US 2014/0349121 A1     Nov. 27, 2014

(30) Foreign Application Priority Data
Dec. 22, 2011 (JP) .................................. 2011-282396

(51) Int. Cl.
*C09D 5/08* (2006.01)
*C09D 7/61* (2018.01)
*C23C 26/00* (2006.01)
*C08K 3/22* (2006.01)

(52) U.S. Cl.
CPC .............. *C23C 26/00* (2013.01); *C09D 5/084* (2013.01); *C09D 7/61* (2018.01); C08K 2003/222 (2013.01); *Y10T 428/31529* (2015.04)

(58) Field of Classification Search
CPC .................................. C09D 5/08; C09D 5/084
See application file for complete search history.

(56) References Cited

U.S. PATENT DOCUMENTS

| | | | |
|---|---|---|---|
| 5,037,478 A | 8/1991 | Okai | |
| 2003/0183306 A1* | 10/2003 | Hehmann | C23C 14/14 148/404 |
| 2008/0233390 A1* | 9/2008 | Gothlich | C08F 220/06 428/336 |
| 2010/0273013 A1* | 10/2010 | Jin | C23C 22/40 428/447 |

FOREIGN PATENT DOCUMENTS

| | | | |
|---|---|---|---|
| GB | 2112375 A * | 7/1983 | C03C 3/21 |
| JP | 2001-172570 | 6/2001 | |
| JP | 2008-291160 | 12/2008 | |
| JP | 2008-291162 | 12/2008 | |
| JP | 2008291160 A * | 12/2008 | |
| JP | 2011-184624 | 9/2011 | |
| WO | WO-2012/001468 | 1/2012 | |

OTHER PUBLICATIONS

Machine translation; Hideki et al; JP 2008-291160A; Dec. 2008.*
Wikipedia—defintion of Glass; Nov. 2010.*
Glass, Wikipedia; Jan. 2010.*
PCT International Search Report and Written Opinion in PCT/IB2012/002623, dated Mar. 19, 2013, 12 pages.
International Preliminary Report on Patentability in PCT/IB2012/002623, dated Jun. 24, 2014, 8 pages.

* cited by examiner

*Primary Examiner* — Karuna P Reddy
(74) *Attorney, Agent, or Firm* — McDonnell Boehnen Hulbert & Berghoff

(57) ABSTRACT

To provide a chromium-free paint composition which can provide paint films which are excellent in terms of corrosion resistance on the edge surfaces, scratched surfaces and worked parts of a pre-coated steel sheet, and the paint films which can be obtained by coating this chromium-free paint composition. A chromium-free paint composition which includes paint film-forming resin (A), anti-rust pigment (B), comprising at least one type of amorphous $MgO$—$V_2O_5$-based compound, and crosslinking agent (C) which is characterized in that the mass content proportion of the aforementioned anti-rust pigment (B) is from 10 to 80 mass % with respect to the sum of the resin solid fraction mass of the aforementioned paint film-forming resin (A) and the aforementioned crosslinking agent (C), and the overall eluted ion content in a 10% aqueous solution of the aforementioned anti-rust pigment (B) is from 10 ppm to 100 ppm.

10 Claims, No Drawings

CHROMIUM-FREE PAINT COMPOSITION AND PAINT FILMS OBTAINED BY COATING SAME

CROSS-REFERENCE TO RELATED APPLICATIONS

This application is the National Stage entry of PCT/IB2012/002623, filed on Dec. 4, 2012, which claims priority to Japanese Application Number 2011-282396, filed on Dec. 22, 2011, which are incorporated herein by reference in their entireties.

TECHNICAL FIELD

The invention concerns chromium-free paint compositions which are suitable for use as undercoat paints in the production of pre-coated steel sheets.

BACKGROUND TECHNOLOGY

The pre-coated steel sheet is generally produced with a two-coat two-bake system in which an undercoat paint is coated on a base steel sheet as typified by a zinc-based plated steel sheet after carrying out a chemical forming treatment as a pre-treatment, heated and cured and then a top-coat paint is coated, heated and cured. Pre-coated steel sheets which have been produced in this way are delivered initially to the user in the form of a coil. Hence the user unwinds the coil and cuts off the amount which is required for the application and works this into various shapes for use.

The pre-coated steel sheet is cut and subjected to working after the paint film has been formed and so there are end surfaces and often cracks and scratches in the worked parts where the metal is exposed locally and a lowering of corrosion resistance and peeling of the paint film are liable to arise in such parts. Hence, in the past the base steel sheet has been subjected to a chemical forming treatment which includes chromate and, moreover, an undercoat paint which contains a chromium-based anti-rust pigment has been applied in order to ensure corrosion resistance and adhesion of the paint film on the base steel sheet.

However, in recent years the adverse effects on the environment due to the dissolving out of highly toxic chromium have been regarded as a problem and there is a demand for chromium-free paint compositions in which no chromium-based anti-rust pigment is used as undercoat paints.

Paints in which vanadium compounds are used as anti-rust pigments are known as chromium-free paint compositions (for example Patent Documents 1 to 4).

A chromium-free paint composition which is characterized by containing silica particles which have a specified average particle diameter, oil uptake and pore volume and magnesium salts which include magnesium vanadate has been disclosed in Patent Document 1. Furthermore, a chromium-free paint composition in which metal silicate and a metal hydrogen phosphate are used conjointly with at least one type of vanadium compound selected from among vanadium pentoxide, calcium vanadate and magnesium vanadate as anti-rust pigments has been disclosed in Patent Document 2.

Furthermore, a chromium-free paint composition in which molybdenum oxide, metal silicate, phosphoric acid-based metal salt and at least one type of vanadium compound from among vanadium pentoxide, calcium vanadate and magnesium vanadate are used conjointly as anti-rust pigments has been disclosed in Patent Document 3.

However, the chromium-free paint compositions described in Patent Documents 1 to 3 provide poor corrosion resistance when compared with paints in which chromium-based pigments are used and the corrosion resistance on the end surfaces in particular is inadequate. Furthermore, the water resistance is often poor when anti-rust pigments are used in large amounts and so this has not resulted in the substitution of chromium-based anti-rust pigments in the production of pre-coated metal sheets. Furthermore, the processes are complicated since a plurality of anti-rust pigments must be added.

Moreover, it is disclosed in Patent Document 4 that paint films with which corrosion resistance and moisture resistance are improved can be formed by setting the conductivity and pH of a 1 mass % aqueous solution of calcium vanadate in an anti-rust paint composition which contains calcium vanadate as an anti-rust pigment within specified ranges.

However, the paint compositions described in Patent Document 4 provide poor long-term corrosion resistance in corrosive environments which have a high wet rate such as salt-water spray tests when compared with paints in which chromium-based pigments are used, and the corrosion resistance in worked parts and at the end surface parts in particular is unsatisfactory. Moreover, when used for a coated steel sheet where the base material comprises 55% Al—Zn-based melt plated steel sheet, white rust and red rust formation is formed from the end surface part even in the early stages of corrosion depending on the pH of the calcium vanadate and satisfactory corrosion resistance is not obtained and so this has not resulted in the substitution of chromium-based anti-rust pigments in the production of pre-coated metal sheets.

PRIOR ART LITERATURE

Patent Documents

Patent Document 1:
Japanese unexamined patent application laid open 2001-172570
Patent Document 2:
Japanese unexamined patent application laid open 2008-291160
Patent Document 3:
Japanese unexamined patent application laid open 2008-291162
Patent Document 4:
Japanese unexamined patent application laid open 2011-184624

OUTLINE OF THE INVENTION

Problems to be Resolved by the Invention

Hence, the present invention is intended to provide a chromium-free paint composition which provides paint films which are excellent in terms of corrosion resistance on the end surfaces, worked parts and scratched parts of pre-coated steel sheets.

Means of Resolving these Problems

As a result of thorough research carried out with a view to resolving the problems outlined above the inventors have discovered that the abovementioned problems can be resolved with a chromium-free paint composition which includes anti-rust pigment comprising at least one type of amorphous MgO—$V_2O_5$-based compound. That is to say, the present invention provides a chromium-free paint composition which includes paint film-forming resin (A), anti-rust pigment (B) comprising at least one type of amorphous MgO—$V_2O_5$-based compound and crosslinking agent (C) which is characterized in that the mass content proportion of the aforementioned anti-rust pigment (B) is from 10 to 80 mass % with respect to the sum of the resin solid fraction mass of the aforementioned paint film-forming resin (A) and the aforementioned crosslinking agent (C) and that the total eluted ion content of a 10% aqueous solution of the aforementioned anti-rust pigment (B) is from 10 ppm to 100 ppm.

Furthermore, the present invention provides a chromium-free paint composition in which, in the abovementioned chromium-free paint composition, the pH of a 10 mass % aqueous solution of the aforementioned anti-rust pigment (B) is from 9.0 to 11.0.

Furthermore, the present invention provides a chromium-free paint composition in which, in the abovementioned chromium-free paint composition, the aforementioned anti-rust pigment (B) includes vanadium and magnesium as structural elements and the mol ratio of the aforementioned magnesium with respect to the aforementioned vanadium is from 1.7 to 5.0.

Furthermore, the present invention provides a chromium-free paint composition in which, in the abovementioned chromium-free paint composition, the magnesium compound which is a raw material of the aforementioned amorphous MgO—$V_2O_5$-based compound is at least one type of magnesium-containing compound selected from magnesium oxide and magnesium carbonate.

Furthermore, the present invention provides a chromium-free paint composition in which, in the abovementioned chromium-free paint composition, the vanadium-containing compound which is a raw material of the aforementioned amorphous MgO—$V_2O_5$-based compound is vanadium pentoxide.

Furthermore, the present invention provides a chromium-free paint composition in which, in the abovementioned chromium-free paint composition, the aforementioned paint film-forming resin (A) is at least one type of paint film-forming resin selected from the hydroxyl group-containing epoxy resins of number average molecular weight from 400 to 10,000 and hydroxyl-group containing polyester resins of number average molecular weight from 500 to 20,000.

Furthermore, the present invention provides a chromium-free paint composition in which, in the abovementioned chromium-free paint composition, the aforementioned crosslinking agent (C) is at least one type of crosslinking agent selected from the blocked polyisocyanate compounds and amino resins and the solid fraction mass content proportion of the aforementioned crosslinking agent (C) is from 3 to 60 mass % with respect to the solid fraction mass of the aforementioned paint film-forming resin (A).

Furthermore, the present invention provides paint films obtained by coating the abovementioned chromium-free paint compositions.

Effect of the Invention

It is possible with a chromium-free paint composition of this invention to obtain paint films which are excellent for corrosion resistance in the end surface, scratched surface and worked parts of a pre-coated steel sheet.

Embodiment of the Invention

The paint film-forming resin (A) which is used in a chromium-free paint composition of this invention is not subject to any particular limitation save that it is a resin which has a paint film-forming capacity and which has functional groups which can react with the crosslinking agent (C) but, from the viewpoints of workability and adhesion on the base steel sheet, it is preferably at least one type of paint film-forming resin selected from the epoxy resins and polyester resins. These paint film-forming resins can be used individually and combinations of two or more types can also be used.

In those cases where an epoxy resin is used for the paint film-forming resin (A) there are a bisphenol A-type epoxy resins synthesized from bisphenol A and epichlorhydrin and bisphenol F-type epoxy resins synthesized from bisphenol F and epichlorhydrin as epoxy resins but, from the viewpoint of corrosion resistance, the bisphenol A-type epoxy resins are preferred.

In those cases where an epoxy resin is used for the paint film-forming resin (A) the number average molecular weight of the epoxy resin is, from the viewpoints of workability, corrosion resistance and coating operability, preferably from 400 to 10,000, more desirably from 400 to 9,000 and most desirably from 400 to 8,000. Moreover, the value of the number average molecular weight in this invention is that obtained by means of gel permeation chromatography (GPC) with polystyrene as the standard substance. Furthermore, no particular limitation is imposed upon the epoxy equivalent of the epoxy resin in those cases where an epoxy resin is used for the paint film-forming resin (A) but it is, for example, preferably from 180 to 5,000.

In those cases where an epoxy resin is used for the paint film-forming resin (A) all or some of the epoxy groups of this epoxy resin may have been modified by reaction with a modifying agent. Examples of the epoxy resin modifying agents include polyester, alkanolamine, caprolactone, isocyanate compound, phosphoric acid compound, acid anhydride and the like. These modifying agents can be used individually and combinations of two or more types can also be used.

In those cases where a polyester resin is used for the paint film-forming resin (A) the polyester resin can be obtained by means of a known method using the reaction of polyhydric alcohols and polybasic acids.

Glycols and polyhydric alcohols which have three or more hydroxyl groups can be cited as polyhydric alcohols. Examples of the glycols include ethylene glycol, propylene glycol, diethylene glycol, triethylene glycol, tetraethylene glycol, dipropylene glycol, polyethylene glycol, polypropylene glycol, neopentyl glycol, hexylene glycol, 1,3-butanediol, 1,4-butanediol, 1,5-pentanediol, 1,6-hexanediol, 2-butyl-2-ethyl-1,3-propanediol, methyipropanediol, cyclohexanedimethanol, 3,3-ditheyl-1,5-pentanediol and the like. Furthermore, examples of the polyhydric alcohols which have three or more hydroxyl groups include glycerol, trimethylolethane, trimethylol-propane, pentaerythritol, dipentaerythritol and the like. These polyhydric alcohols can be used individually and combinations of two or more types can also be used.

Generally polycarboxylic acids are used for the polybasic acid but monocarboxylic acids and the like can be used conjointly, as required. Examples of the polycarboxylic acids include phthalic acid, tetrahydrophthalic acid, hexahydrophthalic acid, 4-methylhexahydrophthalic acid, bicyclo[2,2,1]heptane-2,3-dicarboxylic acid, trimellitic acid, adipic acid, sebacic acid, succinic acid, azeleic acid, fumaric acid, maleic acid, itaconic acid, pyromellitic acid, dimer acid and the like, the anhydrides of these acids, and 1,4-cyclohexanedicarboxylic acid, isophthalic acid, tetrahydroisophthalic acid, hexahydroisophthalic acid, hexahydroterephthalic acid and the like. These polybasic acids can be used individually and combinations of two or more types can also be used.

In those cases where a polyester resin is used for the paint film-forming resin (A) the hydroxyl group value of the polyester resin is, from the viewpoints of solvent resistance, workability and the like, preferably from 5 to 200 mgKOH/g, more desirably from 7 to 150 mgKOH/g and most desirably from 10 to 130 mgKOH/g.

In those cases where a polyester resin is used for the paint film-forming resin (A) the number average molecular weight of the polyester resin is, from the viewpoints of solvent resistance, workability and the like, preferably from 500 to 20,000, more desirably from 700 to 18,000 and most desirably from 800 to 16,000.

Furthermore, no particular limitation is imposed upon the acid value of the polyester resin in those cases where a polyester resin is used for the paint film-forming resin (A), but it is, for example, preferably from 0 to 10 mgKOH/g.

A chromium-free paint composition of this invention contains an anti-rust pigment (B) comprising at least one type of amorphous $MgO-V_2O_5$-based compound.

The amorphous $MgO-V_2O_5$-based compounds which can be used in the invention can be obtained by means of a know method of production and the method of production with which they are obtained by mixing and reacting magnesium-containing compounds and vanadium-containing compounds in water can be cited as an example. In this case the reaction product is subjected to treatments such as washing with water, de-watering, drying, pulverization and the like.

Magnesium oxide and various magnesium salts can be used for the magnesium-containing compounds which form the raw materials for producing amorphous $MgO-V_2O_5$-based compounds which can be used in this invention. In more practical terms examples include magnesium oxide, magnesium carbonate, magnesium hydroxide, magnesium chloride, magnesium nitrate, magnesium acetate, magnesium sulfate and the like. From among these magnesium oxide and magnesium carbonate in particular are preferred. These magnesium-containing compounds can be used individually and combinations of two or more types can also be used.

Vanadium oxide and various vanadium salts can be used for the vanadium-containing compounds which form the raw materials for producing amorphous $MgO-V_2O_5$-based compounds which can be used in this invention. In more practical terms examples include vanadium pentoxide, potassium vanadate, sodium vanadate, ammonium vanadate and the like. From among these vanadium pentoxide in particular is preferred. These vanadium-containing compounds can be used individually and combinations of two or more types can also be used.

By selecting appropriate raw materials from among these magnesium-containing compounds and vanadium-containing compounds it is possible to obtain the desired amorphous $MgO-V_2O_5$-based compounds. At least one type of amorphous $MgO-V_2O_5$-based compound which has been obtained in this way is used as the anti-rust pigment (B) in a chromium-free paint composition of this invention.

The anti-rust pigment (B) of this invention includes vanadium and magnesium as structural elements and the mol ratio of magnesium with respect to vanadium is, from the viewpoint of corrosion resistance, preferably rom 1.7 to 5.0, more desirably from 2.0 to 5.0 and most desirably from 2.3 to 4.5.

Moreover, in those cases where two or more types of amorphous $MgO-V_2O_5$-based compounds are used for the anti-rust pigment (B) the mol ratio of magnesium with respect to vanadium in the anti-rust pigment (B) is determined on the basis of the total amounts of vanadium and magnesium included as structural elements in each of the amorphous $MgO-V_2O_5$-based compounds.

In terms of the anti-rust pigment (B) of this invention, it is possible to obtain a paint film with which high corrosion resistance can be maintained for a prolonged period of time by having the total eluted ion content of a 10 mass % aqueous solution of the anti-rust pigment (B) within a specified range.

A 10 mass % aqueous solution of the anti-rust pigment (B) is prepared by adding 10 g of the anti-rust pigment (B) in 90 g of ion-exchanged water and preparing a liquid suspension and then vigorously shaking the liquid suspension for 1 minute and leaving it to stand at room temperature for 24 hours.

The total eluted ion content of the 10 mass % aqueous solution of the anti-rust pigment (B) in this invention is the value obtained by extracting the supernatant liquid of the 10 mass % aqueous solution of the anti-rust pigment (B) prepared in the way outlined above and measurement using ICP emission analysis apparatus (JY-238 Ultrace, produced by the Horiba Seisakujo Co.).

The total eluted ion content of the 10 mass % aqueous solution of the anti-rust pigment (B) in this invention is from 10 to 100 ppm and, from the viewpoint of being able to maintain high corrosion resistance over a long period of time, it is preferably from 15 to 90 ppm and more desirably from 20 to 80 ppm.

If the total eluted ion content is less than 10 ppm then there are cases where the corrosion resistance declines, and if it exceeds 100 ppm then a lowering of water resistance arises and there are cases where the corrosion resistance declines.

No particular limitation is imposed upon the grain size of the anti-rust pigment (B) comprising amorphous $MgO-V_2O_5$-based compounds of this invention but it is suitably within the range from 10 to 30 μm. Moreover, the grain size is obtained as the particle diameter showing a 50% frequency (mid-grain size) in the grain size distribution measured with laser diffraction/scattering-type grain size distribution measuring apparatus (trade name LA-920, produced by the Horiba Seisakujo Co.).

The anti-rust pigment (B) of this invention exhibits optimum elution properties and solubility and so high corrosion resistance can be maintained over a long period of time even without the conjoint use of other anti-rust pigments and, moreover, corrosion not just of the coated surface of the object which has been painted but also of the end surface parts can be prevented effectively.

It is possible to obtain paint films which have even better corrosion resistance by having the pH of a 10 mass % aqueous solution of the anti-rust pigment (B) of this invention within a specified range.

The pH of a 10 mass % aqueous solution of an anti-rust pigment (B) in this invention is the value measured with a pH meter (HM-20S, produced by the Toa Denpa Kogyo Co.) on extracting the supernatant liquid of a 10 mass % aqueous solution of the anti-rust pigment (B) prepared with the method described above.

From the viewpoint of corrosion resistance the pH of a 10 mass % aqueous solution of an anti-rust pigment (B) of this invention is preferably from 9.0 to 11.0, more desirably from 9.5 to 11.0 and most desirably from 10.0 to 11.0. By using an anti-rust pigment (B) of which the pH of a 10 mass % aqueous solution is within the ideal range it is possible to obtain paint films which exhibit high corrosion resistance even in those cases where the object being painted is a plated steel sheet which includes zinc or aluminum since, as a result of the pH buffering action, a pH value in the region in which the anodic reaction of zinc occurs (pH from 6 to 8) is unlikely to arise.

The mass content proportion of the anti-rust pigment (B) is from 10 to 80 mass % with respect to the sum of the resin solid fraction masses of the aforementioned paint film-forming resin (A) and the aforementioned crosslinking agent (C) and, from the viewpoint of the corrosion resistance, it is more desirably from 15 to 80 mass % and most desirably from 20 to 80 mass %.

If the mass content proportion of the anti-rust pigment (B) is less than 10 mass % then there are cases where the corrosion resistance is unsatisfactory, and if it exceeds 80 mass % then there are cases where the mechanical properties and adhesion on base material steel sheet decline.

With the inclusion of an anti-rust pigment (B) comprising at least one type of amorphous $MgO-V_2O_5$-based compound, a chromium-free paint composition of this invention exhibits excellent corrosion resistance with just the anti-rust pigment (B) without the conjoint use of other anti-rust pigments, but other chromium-free type anti-rust pigments may be used conjointly, as required. Examples of other chromium-free type anti-rust pigments include molybdate pigments, phosphomolybdate pigments, calcium-silica-based pigments, phosphate-based pigments, silicate-based pigments and the like.

The crosslinking agents (C) which are used in this invention react with the paint film-forming resin (A) to form a cured paint film. Amino resins, polyisocyanate compounds, blocked polyisocyanate compounds and the like can be cited as examples of the crosslinking agent (C), but from the viewpoints of workability and generality the melamine resins and blocked polyisocyanate compounds are preferred. These crosslinking agents can be used individually and combinations of two or more types can also be used.

Amino resin is a general term signifying resins where formaldehyde has been added to compounds which include amino groups and condensed, and in more practical terms examples of these include melamine resins, urea resins, guanamine resins and the like. From among these the melamine resins are preferred. The partially or fully methylolated melamine resins obtained by reacting melamine and formaldehyde, the alkyl etherified type melamine resins obtained by partially or completely etherifying some or all of the methylol groups of the methylolated melamine resins with an alcohol component, imino group-containing melamine resins and mixtures of these types of melamine resin can be cited as examples of the melamine resins. Examples of the alkyl ether type melamine resins include methylated melamine resins, butylated melamine resins, methyl/butyl mixed alkyl type melamine resins and the like.

Examples of the polyisocyanate compounds include aliphatic diisocyanates such as hexamethylene diisocyanate, trimethylhexamethylene diisocyanate, dimer acid diisocyanate and the like, and also cyclic aliphatic diisocyanates such as isophorone diisocyanate, xylylene diisocyanate (XDI), m-xylylene diisocyanate, hydrogenated XDI and the like and, moreover, aromatic diisocyanates such as tolylene diisocyanate (TDI), 4,4-diphenylmethane diisocyanate (MDI), hydrogenated TDI, hydrogenated MDI and the like, and adducts, biuret forms and isocyanurate forms of these. These polyisocyanate compounds can be used individually and combinations of two or more types can also be used.

Examples of the blocked polyisocyanate compounds include those where the isocyanate groups of a polyisocyanate compound have been blocked with, for example, an alcohol such as butanol or the like, an oxime such as methyl ethyl ketone oxime or the like, a lactam such as ε-caprolactam or the like, a diketone such as an acetoacetic acid diester or the like, an imidazole such as imidazole, 2-ethylimidazole or the like or a phenol such as m-cresol or the like.

The solid fraction mass content proportion with respect to the paint film-forming resin (A) of the crosslinking agent (C) in a chromium-free paint composition of this invention is, from the viewpoints of corrosion resistance and workability, preferably from 3 to 60 mass %, more desirably from 5 to 50 mass %, and most desirably from 10 to 40 mass %.

In addition to the components indicated above, the various known components which are generally used in the paint field can be included, as required, in a chromium-free paint composition of this invention. In more practical terms examples include various surface controlling agents such as leveling agents, anti-foaming agents and the like, various additives such dispersing agents, settling inhibitors, ultraviolet absorbers, light stabilizers and the like, various pigments such as coloring pigments, true pigments and the like, glitter materials, curing catalysts, organic solvents and the like.

A paint composition of this invention may be an organic solvent type paint or an aqueous paint, but it is preferably an organic solvent type paint. The organic solvents include one type, or a mixture of two or more types, of, for example, the ketone-based solvents such as cyclohexanone and the like, the aromatic solvents such as Solvesso 100 (trade name, produced by the Exxon Mobil Chemical Co.) and the like, and the alcohol-based solvents such as butanol and the like.

Examples of the objects which are to be coated with a chromium-free paint composition of this invention are those where treatment with a chromium-free or chromate-based chemical forming agent or the like has been carried out on various types of zinc-plated steel sheet such as molten-zinc-plated steel sheet, electro-zinc-plated steel sheet, alloying zinc-plated steel sheet, aluminum-zinc-plated steel sheet, nickel-zinc-plated steel sheet, magnesium-aluminum-zinc-plated steel sheet, magnesium-aluminum-silica-zinc-plated steel sheet and the like, stainless steel sheet, aluminum sheet and the like. The use of a chromium-free chemical forming treatment agent at the time of the chemical forming treatment is preferred.

Generally a top-coat paint is painted over the undercoat paint in the production of pre-coated steel sheets. It is possible to provide a pre-coated steel sheet with a beautiful appearance by coating a top-coat paint and, furthermore, it is possible to raise various aspects of performance such as the workability, weather resistance, resistance to chemical attack, staining resistance, water resistance, corrosion resistance and the like which are required of a pre-coated steel sheet.

No particular limitation is imposed upon the application in which a chromium-free paint composition of this invention is used, but it is preferably used as an undercoat paint in the production of pre-coated steel sheets.

Polyester resin-based paints, silicon-polyester resin-based paints, polyurethane resin-based paints, acrylic resin-based paints, fluorinated resin-based paints and the like can be cited as examples of the top-coat paints when a chromium-free paint composition of this invention is used as an undercoat paint in the production of a pre-coated steel sheet.

The methods which are generally used in the production of pre-coated steel sheets, for example roll-coater coating, curtain-flow coater coating and the like, can be adopted as the method of coating a chromium-free paint composition of this invention.

The general coating conditions for the production of pre-coated steel sheets can be adopted as the coating conditions for a chromium-free paint composition of this invention.

The coated film thickness of the undercoat paint in the production of pre-coated steel sheets is, for example, from 1 to 30 μm, and the heating and curing conditions of the undercoat paint film are, for example, a maximum sheet temperature reached of from 150 to 300° C. and a curing time of from 15 to 150 seconds.

The coated film thickness of the top-coat paint in the production of pre-coated steel sheets is, for example, from 10 to 25 μm, and the heating and curing conditions of the top-coat paint film are, for example, a maximum sheet temperature reached of from 190 to 250° C. and a curing time of from 20 to 180 seconds.

Moreover, one or more mid-coat paint films may be formed between the undercoat paint film and the top-coat paint film in accordance with the performance required of the pre-coated steel sheet.

A chromium-free paint composition of this invention can also be used as a top-coat paint for coating the reverse side of the base steel sheet in the production of pre-coated steel sheets. It is possible to obtain coated metal sheets which have excellent corrosion resistance and which are environmentally friendly, containing no chromium-based anti-rust pigment, by forming paint films by coating a chromium-free paint composition of this invention on both sides of the base steel sheet.

ILLUSTRATIVE EXAMPLES

The invention is described in more detail below by means of illustrative examples, but the invention is not limited by these examples. Moreover, in the absence of any indication to the contrary the terms "parts", "%" and "ratio" in the examples signify "parts by mass", "mass %" and "mass ratio" respectively.

Example of Production 1-1: Preparation of Anti-Rust Pigment B1

Magnesium oxide (470 g) and 530 g of vanadium pentoxide were added to 10 L of deionized water and, after raising the temperature to 60° C., the mixture was stirred for 2 hours at the same temperature. The reaction product obtained was de-watered after being washed with water and then dried at 100° C. and pulverized to provide the amorphous MgO—$V_2O_5$-based compound 1. This was the anti-rust pigment B1.

Example of Production 1-2: Preparation of Anti-rust Pigment B2

The amounts of the raw materials used were changed to 530 g of magnesium oxide and 470 g of vanadium pentoxide and amorphous MgO—$V_2O_5$-based compound 2 was obtained with the same method as in Example of Production 1-1. This was the anti-rust pigment B2.

Example of Production 1-3: Preparation of Anti-rust Pigment B3

The amounts of the raw materials used were changed to 570 g of magnesium oxide and 430 g of vanadium pentoxide and amorphous MgO—$V_2O_5$-based compound 3 was obtained with the same method as in Example of Production 1-1. This was the anti-rust pigment B3.

Example of Production 1-4: Preparation of Anti-Rust Pigment B4

The amounts of the raw materials used were changed to 640 g of magnesium oxide and 360 g of vanadium pentoxide and amorphous MgO—$V_2O_5$-based compound 4 was obtained with the same method as in Example of Production 1-1. This was the anti-rust pigment B4.

Example of Production 1-5: Preparation of Anti-rust Pigment B5

The amounts of the raw materials used were changed to 670 g of magnesium oxide and 330 g of vanadium pentoxide and amorphous MgO—$V_2O_5$-based compound 5 was obtained with the same method as in Example of Production 1-1. This was the anti-rust pigment B5.

Example of Production 1-6: Preparation of Anti-rust Pigment B6

The amounts of the raw materials used were changed to 400 g of magnesium oxide and 600 g of vanadium pentoxide and amorphous MgO—$V_2O_5$-based compound 6 was obtained with the same method as in Example of Production 1-1. This was the anti-rust pigment B6.

Example of Production 1-7: Preparation of Anti-Rust Pigment B7

The amorphous MgO—$V_2O_5$-based compound 5 (500 g) and 500 g of the amorphous MgO—$V_2O_5$-based compound 6 were uniformly mixed using a pestle and mortar and the anti-rust pigment B7 was obtained.

Example of Production 1-8: Preparation of Anti-Rust Pigment B8

The amounts of the raw materials used were changed to 730 g of magnesium oxide and 270 g of vanadium pentoxide and amorphous MgO—$V_2O_5$-based compound 8 was obtained with the same method as in Example of Production 1-1. This was the anti-rust pigment B8.

Example of Production 1-9: Preparation of Anti-rust Pigment 89

The amounts of the raw materials used were changed to 250 g of magnesium oxide and 750 g of vanadium pentoxide and amorphous MgO—$V_2O_5$-based compound 9 was obtained with the same method as in Example of Production 1-1. This was the anti-rust pigment B9.

Example of Production 1-10: Preparation of Anti-rust Pigment B10

The amounts of the raw materials used were changed to 740 g of magnesium oxide and 260 g of vanadium pentoxide and amorphous MgO—$V_2O_5$-based compound 10 was obtained with the same method as in Example of Production 1-1. This was the anti-rust pigment B10.

Example of Production 1-11: Preparation of Anti-rust Pigment B11

The amorphous MgO—$V_2O_5$-based compound 8 (600 g) and 400 g of the amorphous MgO—$V_2O_5$-based compound 10 were uniformly mixed using a pestle and mortar and the anti-rust pigment B11 was obtained.

Moreover, the grain sizes of the anti-rust pigments B1 to B11 obtained in the examples of production outlined above were within the range from 10 to 30 μm.

A 10 mass % aqueous solution of the anti-rust pigment was prepared with each of the anti-rust pigments B1 to B11 and the total eluted ion contents and pH values were measured with the methods indicated below.

Preparation of a 10 Mass % Aqueous Solution of an Anti-Rust Pigment

The anti-rust pigment (10 g) and 90 g of ion-exchanged water were added to a wide-necked bottle made of polyethylene. The lid was attached and the liquid suspension obtained on shaking vigorously for 1 minute was left to stand for 24 hours at room temperature and a 10 mass % aqueous solution of the anti-rust pigment was obtained.

Measurement of the Total Eluted Ion Content and pH

The supernatant liquid was collected from each of the mass % aqueous solutions of anti-rust pigment obtained with the method outlined above and, using the filtrate obtained by filtration through a rayon filter paper as the sample, the total eluted ion content was measured using ICP emission spectral analysis apparatus (JY-328 Ultrace, produced by the Horiba Seisakujo Co.). Furthermore, the pH was measured with a pH meter (HM-20S, produced by the Toa Denpa Kogyo Co.). The measured results are summarized in Table 1.

TABLE 1

| Anti-rust Pigment (B) | Mg/V (mol ratio) | Total Eluted Ion Content of a 10 mass % Aqueous Solution (ppm) | pH of a 10 mass % Aqueous Solution |
|---|---|---|---|
| B1 | 2.0 | 43.2 | 10.7 |
| B2 | 2.5 | 39.6 | 10.8 |
| B3 | 3.0 | 33.7 | 10.8 |
| B4 | 4.0 | 20.1 | 10.9 |
| B5 | 4.6 | 13.4 | 10.8 |
| B6 | 1.5 | 70.6 | 10.5 |
| B7 | 3.0 | 27.8 | 10.8 |
| B8 | 6.1 | 6.2 | 11.8 |
| B9 | 0.8 | 144 | 10.1 |
| B10 | 3.1 | 31.9 | 8.8 |
| B11 | 4.9 | 12.3 | 11.2 |

Example 1: Production of Chromium-Free Paint Composition CF1

Epoxy resin (trade name jER 1009, bisphenol A-type epoxy resin, produced by the Mitsubishi Kagaku Co., 80 parts) was heated and dissolved in 120 parts of a mixed solvent (aromatic solvent (trade name Solvesso 100, produced by the Exxon Mobil Chemical Co.)/cyclohexanone/n-butanol=55/27/18 (mass ratio)) using a flask which had been furnished with stirring apparatus, a condenser and a thermometer and an epoxy resin solution which formed a paint film-forming component (A) was obtained. Next 30 parts of cyclohexanone and 30 parts of aromatic solvent (trade name Solvesso 150, produced by the Exxon Mobil Chemical Co.) were added to 200 parts of this epoxy resin solution, 15 parts of the anti-rust pigment B1 were added and dispersed in a sand grind mill until the grain sized reached from 20 to 25 μm and a mill base was obtained. A blocked isocyanate compound (trade name Desmodur BL-3175, produced by the Sumika Beyer Urethane Co, 21 parts) and 0.3 part of dibutyltin dilaurate (DBTDL) were added to this mill base and mixed uniformly and the chromium-free paint composition CF1 was obtained.

Examples 2 to 34 and Comparative Examples 1 to 11: Production of Chromium-Free Paint Compositions CF2 to 45

The chromium-free paint compositions CF2 to 45 were obtained with the same method as in Example 1 in accordance with the compounding compositions shown in Tables 2 to 8.

TABLE 2

| | | Ex. 1 | Ex. 2 | Ex. 3 | Ex. 4 | Ex. 5 | Ex. 6 | Ex. 7 |
|---|---|---|---|---|---|---|---|---|
| | Chrome-free Paint Composition | CF1 | CF2 | CF3 | CF4 | CF5 | CF6 | CF7 |
| (A) Paint Film-Forming Resin | Epoxy resin solution (Note 1) | 200 | 200 | 200 | 200 | 200 | 200 | 200 |
| | Modified Epoxy Resin (Note 2) | | | | | | | |
| | Polyester Resin (Note 3) | | | | | | | |
| (C) Cross-linking Agent | Blocked polyisocyanate Compound (Note 4) | 21 | 21 | 21 | 21 | 21 | 21 | 21 |
| | Melamine Resin (Note 5) | | | | | | | |
| (B) Anti-rust | B1 | | | | | 45 | | |
| | B2 | | | | | | 45 | |

TABLE 2-continued

|  |  | Ex. 1 | Ex. 2 | Ex. 3 | Ex. 4 | Ex. 5 | Ex. 6 | Ex. 7 |
|---|---|---|---|---|---|---|---|---|
| Pigment | B3 | 15 | 45 | 70 |  |  |  |  |
|  | B4 |  |  |  |  |  | 45 |  |
|  | B5 |  |  |  |  |  |  | 45 |
|  | B6 |  |  |  |  |  |  |  |
|  | B7 |  |  |  |  |  |  |  |
|  | B8 |  |  |  |  |  |  |  |
|  | B9 |  |  |  |  |  |  |  |
|  | B10 |  |  |  |  |  |  |  |
|  | B11 |  |  |  |  |  |  |  |
| Pigment | Titanium Dioxide(Note 9) |  |  |  |  |  |  |  |
|  | Kaolin (Note 10) |  |  |  |  |  |  |  |
|  | Precipitated Barium Sulfate (Note 11) |  |  |  |  |  |  |  |
|  | Finely Powdered Silica (Note 12) |  |  |  |  |  |  |  |
| Curing Catalyst | DBTDL (Note 13) | 0.3 | 0.3 | 0.3 | 0.3 | 0.3 | 0.3 | 0.3 |
| Organic Solvent | Aromatic Solvent (Note 14) | 30 | 30 | 30 | 30 | 30 | 30 | 30 |
|  | Cyclohexanone | 30 | 30 | 30 | 30 | 30 | 30 | 30 |
| (B) Component/{(A) Component + (C) Component} (mass %) |  | 16% | 47% | 73% | 47% | 47% | 47% | 47% |
| (C) Component/(A) Component (mass %) |  | 20% | 20% | 20% | 20% | 20% | 20% | 20% |
| Paint Film Performance Evaluation | Adhesion on Base Steel Sheet | ○ | ○ | ○ | ○ | ○ | ○ | ○ |
|  | Boiling Water Resistance (Paint film anomalies) | ◎ | ◎ | ◎ | ◎ | ◎ | ◎ | ◎ |
|  | Boiling Water Resistance (Adhesion on Base Steel Sheet) | ◎ | ◎ | ◎ | ◎ | ◎ | ◎ | ◎ |
|  | Bending Workability (2T) | ◎ | ◎ | ◎ | ◎ | ◎ | ◎ | ◎ |
|  | Bending Workability (3T) | ◎ | ◎ | ◎ | ◎ | ◎ | ◎ | ◎ |
|  | Corrosion Resistance (4T Bend Worked Part) | ○ | ◎ | ◎ | ○ | ◎ | ◎ | ◎ |
|  | Corrosion Resistance (Cross-cut Part) | ○ | ◎ | ◎ | ◎ | ◎ | ◎ | ◎ |
|  | Corrosion Resistance (Edge Part) | ○ | ◎ | ◎ | ◎ | ◎ | ◎ | ○ |

TABLE 3

|  |  | Ex. 8 | Ex. 9 | Ex. 10 | Ex. 11 | Ex. 12 | Ex. 13 | Ex. 14 |
|---|---|---|---|---|---|---|---|---|
| Chrome-free Paint Composition |  | CF8 | CF9 | CF10 | CF11 | CF12 | CF13 | CF14 |
| (A) Paint Film-Forming Resin | Epoxy resin solution (Note 1) | 200 | 200 | 200 | 200 | 200 | 200 | 200 |
|  | Modified Epoxy Resin (Note 2) |  |  |  |  |  |  |  |
|  | Polyester Resin (Note 3) |  |  |  |  |  |  |  |
| (C) Cross-linking Agent | Blocked polyisocyanate Compound (Note 4) | 21 | 21 | 21 | 21 | 21 | 21 | 16 |
|  | Melamine Resin (Note 5) |  |  |  |  |  |  | 5 |
| (B) Anti-rust Pigment | B1 |  |  |  |  |  |  |  |
|  | B2 |  |  |  |  |  |  |  |
|  | B3 |  |  |  |  | 45 | 45 | 45 |
|  | B4 |  |  |  |  |  |  |  |
|  | B5 |  |  |  |  |  |  |  |
|  | B6 | 45 |  |  |  |  |  |  |
|  | B7 |  | 45 |  |  |  |  |  |
|  | B8 |  |  |  |  |  |  |  |
|  | B9 |  |  |  |  |  |  |  |
|  | B10 |  |  | 45 |  |  |  |  |
|  | B11 |  |  |  | 45 |  |  |  |
| Pigment | Titanium Dioxide(Note 9) |  |  |  |  | 15 | 15 |  |
|  | Kaolin (Note 10) |  |  |  |  | 5 | 5 |  |
|  | Precipitated Barium Sulfate (Note 11) |  |  |  |  | 5 |  |  |
|  | Finely Powdered Silica (Note 12) |  |  |  |  |  | 5 |  |
| Curing Catalyst | DBTDL (Note 13) | 0.3 | 0.3 | 0.3 | 0.3 | 0.3 | 0.3 | 0.3 |
| Organic Solvent | Aromatic Solvent (Note 14) | 30 | 30 | 30 | 30 | 30 | 30 | 30 |
|  | Cyclohexanone | 30 | 30 | 30 | 30 | 30 | 30 | 30 |

TABLE 3-continued

|  |  | Ex. 8 | Ex. 9 | Ex. 10 | Ex. 11 | Ex. 12 | Ex. 13 | Ex. 14 |
|---|---|---|---|---|---|---|---|---|
| (B) Component/{(A) Component + (C) Component} (mass %) |  | 47% | 47% | 47% | 47% | 47% | 47% | 47% |
| (C) Component/(A) Component (mass %) |  | 20% | 20% | 20% | 20% | 20% | 20% | 19% |
| Paint Film Performance Evaluation | Adhesion on Base Steel Sheet | ○ | ○ | ○ | ○ | ○ | ○ | ○ |
|  | Boiling Water Resistance (Paint film anomalies) | ◎ | ◎ | ◎ | ◎ | ◎ | ◎ | ◎ |
|  | Boiling Water Resistance (Adhesion on Base Steel Sheet) | ◎ | ◎ | ◎ | ◎ | ◎ | ◎ | ◎ |
|  | Bending Workability (2T) | ◎ | ◎ | ◎ | ◎ | ◎ | ◎ | ◎ |
|  | Bending Workability (3T) | ◎ | ◎ | ◎ | ◎ | ◎ | ◎ | ◎ |
|  | Corrosion Resistance (4T Bend Worked Part) | ○ | ◎ | ○ | ○ | ◎ | ◎ | ◎ |
|  | Corrosion Resistance (Cross-cut Part) | ◎ | ◎ | ◎ | ◎ | ◎ | ◎ | ◎ |
|  | Corrosion Resistance (Edge Part) | ○ | ◎ | ○ | ○ | ◎ | ◎ | ◎ |

TABLE 4

|  |  | Ex. 15 | Ex. 16 | Ex. 17 | Ex. 18 | Ex. 19 | Ex. 20 | Ex. 21 |
|---|---|---|---|---|---|---|---|---|
| Chrome-free Paint Composition |  | CF15 | CF16 | CF17 | CF18 | CF19 | CF20 | CF21 |
| (A) Paint Film-Forming Resin | Epoxy resin solution (Note 1) | 200 | 200 |  |  |  |  |  |
|  | Modified Epoxy Resin (Note 2) |  |  | 200 |  |  |  |  |
|  | Polyester Resin (Note 3) |  |  |  | 145 | 145 | 145 | 145 |
| (C) Cross-linking Agent | Blocked polyisocyanate Compound (Note 4) |  | 50 | 60 | 21 | 21 | 21 | 21 |
|  | Melamine Resin (Note 5) | 10 |  |  |  |  |  |  |
| (B) Anti-rust Pigment | B1 |  |  |  |  |  |  | 45 |
|  | B2 |  |  |  |  |  |  |  |
|  | B3 | 45 | 45 | 45 | 15 | 45 | 70 |  |
|  | B4 |  |  |  |  |  |  |  |
|  | B5 |  |  |  |  |  |  |  |
|  | B6 |  |  |  |  |  |  |  |
|  | B7 |  |  |  |  |  |  |  |
|  | B8 |  |  |  |  |  |  |  |
|  | B9 |  |  |  |  |  |  |  |
|  | B10 |  |  |  |  |  |  |  |
|  | B11 |  |  |  |  |  |  |  |
| Pigment | Titanium Dioxide (Note 9) |  |  |  |  |  |  |  |
|  | Kaolin (Note 10) |  |  |  |  |  |  |  |
|  | Precipitated Barium Sulfate (Note 11) |  |  |  |  |  |  |  |
|  | Finely Powdered Silica (Note 12) |  |  |  |  |  |  |  |
| Curing Catalyst | DBTDL (Note 13) | 0 | 0.6 | 0.3 | 0.3 | 0.3 | 0.3 | 0.3 |
| Organic Solvent | Aromatic Solvent (Note 14) | 30 | 30 | 30 | 30 | 30 | 30 | 30 |
|  | Cyclohexanone | 30 | 30 | 30 | 30 | 30 | 30 | 30 |
| (B) Component/{(A) Component + (C) Component} (mass %) |  | 52% | 38% | 36% | 16% | 47% | 73% | 47% |
| (C) Component/(A) Component (mass %) |  | 8% | 47% | 56% | 20% | 20% | 20% | 20% |
| Paint Film Performance Evaluation | Adhesion on Base Steel Sheet | ○ | ○ | ○ | ○ | ○ | ○ | ○ |
|  | Boiling Water Resistance (Paint film anomalies) | ◎ | ◎ | ◎ | ◎ | ◎ | ◎ | ◎ |
|  | Boiling Water Resistance (Adhesion on Base Steel Sheet) | ◎ | ◎ | ◎ | ◎ | ◎ | ◎ | ◎ |
|  | Bending Workability (2T) | ○ | ○ | ○ | ◎ | ◎ | ◎ | ◎ |
|  | Bending Workability (3T) | ◎ | ◎ | ○ | ◎ | ◎ | ◎ | ◎ |
|  | Corrosion Resistance (4T Bend Worked Part) | ◎ | ◎ | ○ | ○ | ◎ | ◎ | ○ |
|  | Corrosion Resistance (Cross-cut Part) | ◎ | ◎ | ◎ | ○ | ◎ | ◎ | ◎ |
|  | Corrosion Resistance (Edge Part) | ◎ | ◎ | ◎ | ○ | ◎ | ◎ | ◎ |

TABLE 5

|  |  | Ex. 22 | Ex. 23 | Ex. 24 | Ex. 25 | Ex. 26 | Ex. 27 | Ex. 28 |
|---|---|---|---|---|---|---|---|---|
| Chrome-free Paint Composition | | CF22 | CF23 | CF24 | CF25 | CF26 | CF27 | CF28 |
| (A) Paint Film-Forming Resin | Epoxy resin solution (Note 1) | | | | | | | |
| | Modified Epoxy Resin (Note 2) | | | | | | | |
| | Polyester Resin (Note 3) | 145 | 145 | 145 | 145 | 145 | 145 | 145 |
| (C) Cross-linking Agent | Blocked polyisocyanate Compound (Note 4) | 21 | 21 | 21 | 21 | 21 | 21 | 21 |
| | Melamine Resin (Note 5) | | | | | | | |
| (B) Anti-rust Pigment | B1 | | | | | | | |
| | B2 | 45 | | | | | | |
| | B3 | | | | | | | |
| | B4 | | 45 | | | | | |
| | B5 | | | 45 | | | | |
| | B6 | | | | 45 | | | |
| | B7 | | | | | 45 | | |
| | B8 | | | | | | | |
| | B9 | | | | | | | |
| | B10 | | | | | | 45 | |
| | B11 | | | | | | | 45 |
| Pigment | Titanium Dioxide (Note 9) | | | | | | | |
| | Kaolin (Note 10) | | | | | | | |
| | Precipitated Barium Sulfate (Note 11) | | | | | | | |
| | Finely Powdered Silica (Note 12) | | | | | | | |
| Curing Catalyst | DBTDL (Note 13) | 0.3 | 0.3 | 0.3 | 0.3 | 0.3 | 0.3 | 0.3 |
| Organic Solvent | Aromatic Solvent (Note 14) | 30 | 30 | 30 | 30 | 30 | 30 | 30 |
| | Cyclohexanone | 30 | 30 | 30 | 30 | 30 | 30 | 30 |
| (B) Component/{(A) Component + (C) Component} (mass %) | | 47% | 47% | 47% | 47% | 47% | 47% | 47% |
| (C) Component/(A) Component (mass %) | | 20% | 20% | 20% | 20% | 20% | 20% | 20% |
| Paint Film Performance Evaluation | Adhesion on Base Steel Sheet | ○ | ○ | ○ | ○ | ○ | ○ | ○ |
| | Boiling Water Resistance (Paint film anomalies) | ◎ | ◎ | ◎ | ◎ | ◎ | ◎ | ◎ |
| | Boiling Water Resistance (Adhesion on Base Steel Sheet) | ◎ | ◎ | ◎ | ◎ | ◎ | ◎ | ◎ |
| | Bending Workability (2T) | ◎ | ◎ | ◎ | ◎ | ◎ | ◎ | ◎ |
| | Bending Workability (3T) | ◎ | ◎ | ◎ | ◎ | ◎ | ◎ | ◎ |
| | Corrosion Resistance (4T Bend Worked Part) | ◎ | ◎ | ◎ | ○ | ◎ | ○ | ○ |
| | Corrosion Resistance (Cross-cut Part) | ◎ | ◎ | ◎ | ◎ | ◎ | ◎ | ◎ |
| | Corrosion Resistance (Edge Part) | ◎ | ◎ | ○ | ○ | ◎ | ○ | ○ |

TABLE 6

|  |  | Ex. 29 | Ex. 30 | Ex. 31 | Ex. 32 | Ex. 33 | Ex. 34 |
|---|---|---|---|---|---|---|---|
| Chrome-free Paint Composition | | CF29 | CF30 | CF31 | CF32 | CF33 | CF34 |
| (A) Paint Film-Forming Resin | Epoxy resin solution (Note 1) | | | | | | |
| | Modified Epoxy Resin (Note 2) | | | | | | |
| | Polyester Resin (Note 3) | 145 | 145 | 145 | 145 | 145 | 145 |
| (C) Cross-linking Agent | Blocked polyisocyanate Compound (Note 4) | 21 | 21 | 16 | | 50 | 60 |
| | Melamine Resin (Note 5) | | | 5 | 10 | | |
| (B) Anti-rust Pigment | B1 | | | | | | |
| | B2 | | | | | | |
| | B3 | 45 | 45 | 45 | 45 | 45 | 45 |
| | B4 | | | | | | |
| | B5 | | | | | | |
| | B6 | | | | | | |
| | B7 | | | | | | |
| | B8 | | | | | | |
| | B9 | | | | | | |
| | B10 | | | | | | |
| | B11 | | | | | | |

TABLE 6-continued

|  |  | Ex. 29 | Ex. 30 | Ex. 31 | Ex. 32 | Ex. 33 | Ex. 34 |
|---|---|---|---|---|---|---|---|
| Pigment | Titanium Dioxide(Note 9) | 15 | 15 |  |  |  |  |
|  | Kaolin (Note 10) | 5 | 5 |  |  |  |  |
|  | Precipitated Barium Sulfate (Note 11) | 5 |  |  |  |  |  |
|  | Finely Powdered Silica (Note 12) |  | 5 |  |  |  |  |
| Curing Catalyst | DBTDL (Note 13) | 0.3 | 0.3 | 0.3 | 0 | 0.6 | 0.6 |
| Organic Solvent | Aromatic Solvent (Note 14) | 30 | 30 | 30 | 30 | 30 | 30 |
|  | Cyclohexanone | 30 | 30 | 30 | 30 | 30 | 30 |
| (B) Component/{(A) Component + (C) Component} (mass %) |  | 47% | 47% | 47% | 52% | 38% | 36% |
| (C) Component/(A) Component (mass %) |  | 20% | 20% | 19% | 8% | 47% | 56% |
| Paint Film Performance Evaluation | Adhesion on Base Steel Sheet | ○ | ○ | ○ | ○ | ○ | ○ |
|  | Boiling Water Resistance (Paint film anomalies) | ◎ | ◎ | ◎ | ◎ | ◎ | ◎ |
|  | Boiling Water Resistance (Adhesion on Base Steel Sheet) | ◎ | ◎ | ◎ | ○ | ○ | ○ |
|  | Bending Workability (2T) | ◎ | ◎ | ◎ | ◎ | ◎ | ○ |
|  | Bending Workability (3T) | ◎ | ◎ | ◎ | ◎ | ◎ | ○ |
|  | Corrosion Resistance (4T Bend Worked Part) | ◎ | ◎ | ◎ | ◎ | ◎ | ○ |
|  | Corrosion Resistance (Cross-cut Part) | ◎ | ◎ | ◎ | ◎ | ◎ | ◎ |
|  | Corrosion Resistance (Edge Part) | ◎ | ◎ | ◎ | ◎ | ◎ | ◎ |

TABLE 7

|  |  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| Chrome-free Paint Composition |  | CF35 | CF36 | CF37 | CF38 | CF39 | CF40 |
| (A) Paint Film-Forming Resin | Epoxy resin solution (Note 1) | 200 | 200 | 200 | 200 | 200 | 200 |
|  | Modified Epoxy Resin (Note 2) |  |  |  |  |  |  |
|  | Polyester Resin (Note 3) |  |  |  |  |  |  |
| (C) Cross-linking Agent | Blocked polyisocyanate Compound (Note 4) | 21 | 21 | 21 | 21 | 21 | 21 |
|  | Melamine Resin (Note 5) |  |  |  |  |  |  |
| (B) Anti-rust Pigment | B1 |  |  |  |  |  |  |
|  | B2 |  |  |  |  |  |  |
|  | B3 |  |  |  |  |  | 8 |
|  | B4 |  |  |  |  |  |  |
|  | B5 |  |  |  |  |  |  |
|  | B6 |  |  |  |  |  |  |
|  | B7 |  |  |  |  |  |  |
|  | B8 |  |  |  | 45 |  |  |
|  | B9 |  |  |  |  | 45 |  |
|  | B10 |  |  |  |  |  |  |
|  | B11 |  |  |  |  |  |  |
| Other Anti-rust Pigments | Vanadium Pentoxide (Note 6) | 45 | 20 |  |  |  |  |
|  | Magnesium Oxide (Note 7) |  | 25 |  |  |  |  |
|  | Calcium Vanadate (Note 8) |  |  | 45 |  |  |  |
| Pigment | Titanium Dioxide(Note 9) |  |  |  |  |  |  |
|  | Kaolin (Note 10) |  |  |  |  |  |  |
|  | Precipitated Barium Sulfate (Note 11) |  |  |  |  |  |  |
|  | Finely Powdered Silica (Note 12) |  |  |  |  |  |  |
| Curing Catalyst | DBTDL (Note 13) | 0.3 | 0.3 | 0.3 | 0.3 | 0.3 | 0.3 |
| Organic Solvent | Aromatic Solvent (Note 14) | 30 | 30 | 30 | 30 | 30 | 30 |
|  | Cyclohexanone | 30 | 30 | 30 | 30 | 30 | 30 |
| (B) Component/{(A) Component + (C) Component} (mass %) |  | 0% | 0% | 0% | 47% | 47% | 8% |
| (C) Component/(A) Component (mass %) |  | 20% | 20% | 20% | 20% | 20% | 20% |
| Paint Film Performance Evaluation | Adhesion on Base Steel Sheet | ○ | ○ | ○ | ○ | ○ | ○ |
|  | Boiling Water Resistance (Paint film anomalies) | ◎ | X | ◎ | ◎ | ○ | ◎ |

TABLE 7-continued

|  | Comp. Ex. 1 | Comp. Ex. 2 | Comp. Ex. 3 | Comp. Ex. 4 | Comp. Ex. 5 | Comp. Ex. 6 |
| --- | --- | --- | --- | --- | --- | --- |
| Boiling Water Resistance (Adhesion on Base Steel Sheet) | ◎ | X | ◎ | ◎ | X | ◎ |
| Bending Workability (2T) | ◎ | ○ | ○ | ○ | ○ | ◎ |
| Bending Workability (3T) | ◎ | ◎ | ○ | ○ | ○ | ◎ |
| Corrosion Resistance (4T Bend Worked Part) | X | X | X | ○ | X | ◎ |
| Corrosion Resistance (Cross-cut Part) | ○ | X | ○ | ○ | X | ○ |
| Corrosion Resistance (Edge Part) | X | X | X | X | X | X |

TABLE 8

|  |  | Comp. Ex. 7 | Comp. Ex. 8 | Comp. Ex. 9 | Comp. Ex. 10 | Comp. Ex. 11 |
| --- | --- | --- | --- | --- | --- | --- |
| Chrome-free Paint Composition |  | CF41 | CF42 | CF43 | CF44 | CF45 |
| (A) Paint Film-Forming Resin | Epoxy resin solution (Note 1) | 200 |  |  |  |  |
|  | Modified Epoxy Resin (Note 2) |  |  |  |  |  |
|  | Polyester Resin (Note 3) |  | 145 | 145 | 145 | 145 |
| (C) Cross-linking Agent | Blocked polyisocyanate Compound (Note 4) | 21 | 21 | 21 | 21 | 21 |
|  | Melamine Resin (Note 5) |  |  |  |  |  |
| (B) Anti-rust Pigment | B1 |  |  |  |  |  |
|  | B2 |  |  |  |  |  |
|  | B3 | 90 |  |  | 8 | 90 |
|  | B4 |  |  |  |  |  |
|  | B5 |  |  |  |  |  |
|  | B6 |  |  |  |  |  |
|  | B7 |  |  |  |  |  |
|  | B8 |  | 45 |  |  |  |
|  | B9 |  |  | 45 |  |  |
|  | B10 |  |  |  |  |  |
|  | B11 |  |  |  |  |  |
| Other Anti-rust Pigments Pigment | Vanadium Pentoxide (Note 6) |  |  |  |  |  |
|  | Magnesium Oxide (Note 7) |  |  |  |  |  |
|  | Calcium Vanadate (Note 8) |  |  |  |  |  |
|  | Titanium Dioxide (Note 9) |  |  |  |  |  |
|  | Kaolin (Note 10) |  |  |  |  |  |
|  | Precipitated Barium Sulfate (Note 11) |  |  |  |  |  |
|  | Finely Powdered Silica (Note 12) |  |  |  |  |  |
| Curing Catalyst | DBTDL (Note 13) | 0.3 | 0.3 | 0.3 | 0.6 | 0.3 |
| Organic Solvent | Aromatic Solvent (Note 14) | 30 | 30 | 30 | 30 | 30 |
|  | Cyclohexanone | 30 | 30 | 30 | 30 | 30 |
| (B) Component/{(A) Component + (C) Component} (mass %) |  | 94% | 47% | 47% | 8% | 94% |
| (C) Component/(A) Component (mass %) |  | 20% | 27% | 27% | 27% | 27% |
| Paint Film Performance Evaluation | Adhesion on Base Steel Sheet | X | ○ | ○ | ○ | X |
|  | Boiling Water Resistance (Paint film anomalies) | ○ | ◎ | ○ | ◎ | ○ |
|  | Boiling Water Resistance (Adhesion on Base Steel Sheet) | X | ◎ | X | ◎ | X |
|  | Bending Workability (2T) | ○ | ○ | ○ | ◎ | ○ |
|  | Bending Workability (3T) | ○ | ◎ | ○ | ◎ | ○ |
|  | Corrosion Resistance (4T Bend Worked Part) | X | ○ | X | ◎ | X |
|  | Corrosion Resistance (Cross-cut Part) | ◎ | ○ | X | ○ | ◎ |
|  | Corrosion Resistance (Edge Part) | X | X | X | X | X |

Details of each of the compounded components shown in Tables 2 to 8 are indicated below.

(Note 1) The epoxy resin solution was obtained by heating and dissolving 80 parts of epoxy resin (trade name jER 1009, produced by the Mitsubishi Kagaku Co., bisphenol A-type epoxy resin, resin solid fraction 100 mass %, epoxy equivalent 2,500 to 3,500, number average molecular weight 3,800) in 120 parts of mixed solvent (aromatic solvent (trade name Solvesso 100, produced by the Exxon Mobil Chemicals Co.)/cyclohexanone/n-butanol=55/27/18).

(Note 2) Modified epoxy resin (trade name Epiclon H-304-40, produced by the DIC Co., diethanolamine modified epoxy resin, resin solid fraction 40 mass %, number average molecular weight 3,500)

(Note 3) Polyester resin (trade name LH-822, produced by the Ebonik Degussa Co., resin solid fraction 55 mass %, number average molecular weight 5,000, hydroxyl group value 50 mgKOH/g)

(Note 4) Blocked polyisocyanate compound (trade name Desmodur BL-3175, produced by the Sumika Beyer Urethane Co., HDI isocyanurate type polyisocyanate compound blocked with methyl ethyl ketone oxime, resin solid fraction 75 mass %, NCO approximately 11.1 mass %)

(Note 5) n-Butylated melamine resin (trade name Yuban 122, produced by the Mitsui Kagaku Co., resin solid fraction 60 mass %)

(Note 6) Vanadium pentoxide: commercial reagent (Note 7) Magnesium oxide: commercial reagent (Note 8) Calcium vanadate: Commercial reagent (Note 9) Titanium dioxide (trade name R-960, produced by the DuPont Co.)

(Note 10) Kaolin (trade name Hydrite MS, produced by Imerys Minerals Co.)

(Note 11) Precipitated barium sulfate (trade name SS-50, produced by the Sakai Kagaku Kogyo Co.)

(Note 12) Finely powdered silica (trade name Nipsil E-200A, produced by the Toso Silica Co.)

(Note 13) DBTDL (produced by the Nitto Kase Co., involatile fraction 100%)

(Note 14) Aromatic solvent (trade name Solvesso 150, produced by the Exxon Mobil Chemical Co.)

Test pieces on which a chromium-free paint composition of this invention had been used as an undercoat paint were prepared with the method outlined below with each of the chromium-free paint compositions CF1 to CF45 and performance evaluations of the paint films were carried out.

Preparation of a Test Piece

A chromium-free paint composition of this invention was coated with a bar coater in such a way as to provide a dry film thickness of 5 μm on an aluminum/zinc alloy plated steel sheet of thickness 0.35 mm which had been subjected to a chemical forming treatment and baked in a hot-draft drier for 40 seconds with a maximum temperature reached by the sheet of 210° C. and a undercoat paint film was formed. A polyester resin-based top-coat paint (trade name Precolor HD0030, produced by the BASF Coatings Japan Co. Ltd., brown color) was coated over the undercoat paint film with a bar coater in such a way as to provide a dry film thickness of 15 μm and baked in a hot-draft drier for 40 seconds with a maximum temperature reached by the sheet of 220° C., a top-coat paint film was formed and a test piece was obtained.

The test piece obtained was subjected to the paint film performance evaluations indicated below and the results have been shown in Tables 2 to 8.

Adhesion on the Base Steel Sheet

A square pattern of one hundred 1 mm×1 mm squares was formed in the paint film of a test piece using a cutter knife. The part of the paint film on which the pattern had been formed was pushed out from the reverse side of the test piece with a punch in such a way that the distance from the pushed-out surface of the test piece to the tip of the punch was 6 mm using an Erichsen testing machine. Subsequently cellophane tape was pressed and stuck firmly over the pattern part of the pushed-out paint film and peeled off in one action with the end of the tape at an angle of 45°, the state of the pattern was observed and an evaluation was made on the basis of the following criteria:

◯: No peeling of the paint film was observed.

X: Peeling of the paint film was observed.

Boiling Water Resistance

A test piece was immersed for 2 hours in boiling water and allowed to cool for 2 hours at room temperature in accordance with JIS K 5600-6-2 and then the test piece was evaluated using the methods (1) and (2) below.

(1) Paint Film Abnormality

The paint film of the test piece was observed for abnormalities and evaluated on the basis of the following criteria.

◉: No paint film abnormality at all was observed.

◯: Slight bulging of the paint film was observed.

X: Distinct bulging of the paint film was observed.

(2) Adhesion on the Base Metal Sheet

A square pattern of one hundred 1 mm×1 mm squares was formed with a cutter knife in the paint film of a test piece, cellophane tape was firmly stuck over the pattern part and peeled away with the end of the tape at an angle of 45° in accordance with JIS-K 5600-5-6, the state of the pattern was observed and an evaluation was made in accordance with "Table 1, Classification of Test Results" of JIS K 5600-5-6.

◉: Class 0

◯: Class 1

X Classes 2 to 5

Bending Workability

A test piece was bent through 180° in such a way that sheets similar to the test piece were inserted. At this time the number of sheets similar to the test piece within the test piece is indicated by 0T, 2T and the like. For example, 0T indicates that the test piece was bent with no sheet similar to the test piece inserted and 2T indicates that the test piece was bent in such a way that two sheets similar to the test piece were inserted. In the performance evaluation of this invention 2T and 3T tests were carried out and cellophane tape was firmly stuck over the apex part after bending, the tape was peeled away in one action with the end of the tape at an angle of 45° and an assessment was made on the basis of the following criteria depending on the state of peeling of the paint film.

◉: No peeling of the paint film was observed.

◯: Slight peeling of the paint film was observed.

X: Peeling of the paint film was observed.

Corrosion Resistance

Corrosion resistance test pieces were prepared in accordance with (1) to (3) below.

(1) A test piece of 70 mm×150 mm was cut in such a way that the edge part of the test piece had a burr facing the side on which the paint film had been formed (up-burr) and a burr facing the opposite side to that on which the paint film had been formed (down-burr).

(2) The test piece was subjected to 4T bending.

(3) A cross-cut of a depth which reached the base material surface was made in the middle part of the paint film on the side on which the paint film had been formed in such a way that it did not extend over the 4T bend part of (2).

The prepared corrosion resistance test piece was subjected to a salt water spray test (SST) of duration 500 hours in accordance with JIS K5600-7-1 and the state of the edge part, the 4T bend part and the cross cut part of the corrosion resistance test piece after the test were evaluated on the basis of the following criteria:

Edge Part

The widths of the edge creep of the up-burr and the down-burr were measured and evaluated on the basis of the following criteria:

◉ : The average value of the edge creep width of the up-burr and the down-burr was less than 4 mm.
○: The average value of the edge creep width of the up-burr and the down-burr was at least 4 mm but less than 10 mm.
X The average value of the edge creep width of the up-burr and the down-burr was 10 mm or more.

4T Bend Part

The state of occurrence of white rust at the apex where the bending had been carried out was evaluated on the basis of the following criteria:

◉ : Virtually no white rust was observed.
○: A little white rust was observed.
X: White rust was observed.

Cross-Cut Part

The state of occurrence of white rusting of the cross cut part was observed and the width of the swollen paint film was measured and evaluated on the basis of the following criteria:

◉ : Virtually no white rust was observed and the width of the bulging paint film was less than 2 mm.
○: Some white rust was observed and the width of the bulging paint film was at least 2 mm but less than 5 mm.
X: White rust was observed and the width of the bulging paint film was 5 mm or more.

The invention claimed is:

1. A chromium-free paint composition comprising a paint film forming resin (A), an anti-rust pigment (B) that comprises at least one amorphous $MgO$—$V_2O_5$ compound, and a crosslinking agent (C), wherein the mass content proportion of the anti-rust pigment (B) is in the range of from 20 to 80 mass % with respect to the sum of the resin solid fraction mass of the paint film-forming resin (A) and the crosslinking agent (C), the mol ratio of magnesium with respect to vanadium is in the range of from 1.7 to 5.0, and wherein the overall eluted ion content in a 10% aqueous solution of the anti-rust pigment (B) is from 10 ppm to 100 ppm and the pH of the 10% aqueous solution is in the range of 9.0 to 11.0, and wherein the amorphous $MgO$—$V_2O_5$ is produced by mixing and reacting magnesium-containing compounds and vanadium-containing compounds in water, drying, and pulverization.

2. The chromium-free paint composition according to claim 1, wherein the magnesium compound which is a raw material for production of the amorphous $MgO$—$V_2O_5$ compound is at least one magnesium-containing compound selected from the group consisting of magnesium oxide and magnesium carbonate.

3. The chromium-free paint composition according to claim 1, wherein the vanadium-containing compound which is a raw material for production of the amorphous $MgO$—$V_2O_5$ compound is vanadium pentoxide.

4. The chromium-free paint composition according to claim 1, wherein the paint film-forming resin (A) is at least one paint film-forming resin selected from the group consisting of hydroxyl group-containing epoxy resins of number average molecular weight from 400 to 10,000 and hydroxyl-group containing polyester resins of number average molecular weight from 500 to 20,000.

5. The chromium-free paint composition according to claim 1, wherein the crosslinking agent (C) is at least one crosslinking agent selected from the group consisting of blocked polyisocyanate compounds and amino resins, and wherein the solid fraction mass content proportion of the crosslinking agent (C) is from 3 to 60 mass % with respect to the solid fraction mass of the paint film-forming resin (A).

6. A paint film that has been obtained by coating the chromium-free paint composition according to 1.

7. A pre-coated steel sheet comprising a steel sheet and the chromium-free paint composition according to claim 1 coated thereon.

8. A chromium-free paint composition comprising a paint film forming resin (A), an anti-rust pigment (B) that comprises at least one amorphous $MgO$—$V_2O_5$ compound, and a crosslinking agent (C), wherein the mass content proportion of the anti-rust pigment (B) is in the range of from 10 to 80 mass % with respect to the sum of the resin solid fraction mass of the paint film-forming resin (A) and the crosslinking agent (C), and wherein the overall eluted ion content in a 10% aqueous solution of the anti-rust pigment (B) is from 10 ppm to 100 ppm, and wherein anti-rust pigment (B) is used without conjoint use of other anti-rust pigments, and wherein the amorphous $MgO$—$V_2O_5$ is produced by mixing and reacting magnesium-containing compounds and vanadium-containing compounds in water, drying, and pulverization.

9. A chromium-free paint composition comprising a paint film forming resin (A), an anti-rust pigment (B) that comprises at least one amorphous $MgO$—$V_2O_5$ compound, and a crosslinking agent (C), wherein the mass content proportion of the anti-rust pigment (B) is in the range of from 10 to 80 mass % with respect to the sum of the resin solid fraction mass of the paint film-forming resin (A) and the crosslinking agent (C), and wherein the overall eluted ion content in a 10% aqueous solution of the anti-rust pigment (B) is from 10 ppm to 100 ppm, and wherein anti rust pigment (B) the amorphous $MgO$—$V_2O_5$ is produced by mixing and reacting magnesium-containing compounds and vanadium-containing compounds in water, drying, and pulverization.

10. The chromium-free paint composition according to claim 9, wherein the anti-rust pigment (B) has a mol ratio of magnesium to vanadium of from 1.7 to 5.0.

* * * * *